(12) United States Patent
Horiuchi et al.

(10) Patent No.: US 9,417,782 B2
(45) Date of Patent: Aug. 16, 2016

(54) PORTABLE TERMINAL, INPUT CONTROL PROGRAM, AND INPUT CONTROL METHOD

(75) Inventors: Keiji Horiuchi, Daito (JP); Takashi Izumi, Daito (JP)

(73) Assignee: KYOCERA CORPORATION, Kyoto (JP)

( * ) Notice: Subject to any disclaimer, the term of this patent is extended or adjusted under 35 U.S.C. 154(b) by 589 days.

(21) Appl. No.: 13/580,948

(22) PCT Filed: Feb. 23, 2011

(86) PCT No.: PCT/JP2011/001002
§ 371 (c)(1),
(2), (4) Date: Aug. 23, 2012

(87) PCT Pub. No.: WO2011/105061
PCT Pub. Date: Sep. 1, 2011

(65) Prior Publication Data
US 2012/0319979 A1 Dec. 20, 2012

(30) Foreign Application Priority Data
Feb. 24, 2010 (JP) ................. 2010-039000

(51) Int. Cl.
*G06F 3/041* (2006.01)
*G06F 3/0488* (2013.01)
*G06F 3/02* (2006.01)

(52) U.S. Cl.
CPC ............ *G06F 3/0488* (2013.01); *G06F 3/0227* (2013.01)

(58) Field of Classification Search
CPC .............. G06F 3/0488; G06F 3/04886; G06F 3/03547; G06F 3/04883; G06F 3/0416; G06F 2203/04106; G06F 3/02; G06F 3/0219; G06F 3/0227; G06F 3/0232; G06F 3/0233; G06F 3/0235; G06F 3/0237; G06F 3/0238; G06F 3/03; G06F 3/0304; G06F 3/0325; G06F 3/0489; G06F 3/04897; G06F 3/0418; H01H 2239/09; H01H 2200/024

USPC .................................. 345/173, 168
See application file for complete search history.

(56) References Cited

U.S. PATENT DOCUMENTS 5,973,676 A 10/1999 Kawakura
2004/0239636 A1 12/2004 Takahashi
(Continued)

FOREIGN PATENT DOCUMENTS

| JP | H07-073278 A | 3/1995 |
| JP | 2004-112353 A | 4/2004 |

(Continued)

OTHER PUBLICATIONS

International Search Report dated Mar. 22, 2011, issued for International Application No. PCT/JP2011/001002.
Office Action Dated Nov. 10, 2015, issued in counterpart Japanese Application No. 2014-244255.

*Primary Examiner* — Grant Sitta
*Assistant Examiner* — Amen Bogale
(74) *Attorney, Agent, or Firm* — Procopio Cory Hargreaves and Savitch LLP

(57) ABSTRACT

A portable terminal including a touch-sensitive first input device and a touch-sensitive second input device that receive input when contact is made thereto, the portable terminal comprising: a first execution unit configured to execute processing that is in accordance with input received by the first input device; a second execution unit configured to execute processing that is in accordance with input received by the second input device; and a control unit that controls whether or not to inhibit the execution of the second processing by the second execution unit according to which position on the first input device is contacted.

9 Claims, 12 Drawing Sheets

(56) References Cited

U.S. PATENT DOCUMENTS

| | | | |
|---|---|---|---|
| 2004/0257347 A1* | 12/2004 | Noji | G06F 3/0488 345/179 |
| 2007/0070048 A1 | 3/2007 | Aoyagi | |
| 2007/0091070 A1* | 4/2007 | Larsen et al. | 345/168 |
| 2009/0174679 A1 | 7/2009 | Westerman | |
| 2011/0047459 A1* | 2/2011 | Van Der Westhuizen | G06F 1/1692 715/702 |

FOREIGN PATENT DOCUMENTS

| | | | | |
|---|---|---|---|---|
| JP | 2004-355289 A | 12/2004 | | |
| JP | 2005-011233 A | 1/2005 | | |
| JP | 2007-094808 A | 4/2007 | | |
| JP | 2009-217814 A | 9/2009 | | |
| WO | WO 2009049331 A2 * | 4/2009 | | G06F 3/048 |
| ZA | WO 2009049331 A2 * | 4/2009 | | G06F 1/1692 |

* cited by examiner

FIG. 4

| Top left coordinate value | Bottom right coordinate value | Key number |
|---|---|---|
| (610, 10) | (690, 60) | 1 |
| (610, 92) | (690, 142) | 2 |
| (610, 174) | (690, 224) | 3 |
| (610, 256) | (690, 306) | 4 |
| (610, 338) | (690, 388) | 5 |
| (610, 420) | (690, 470) | 6 |

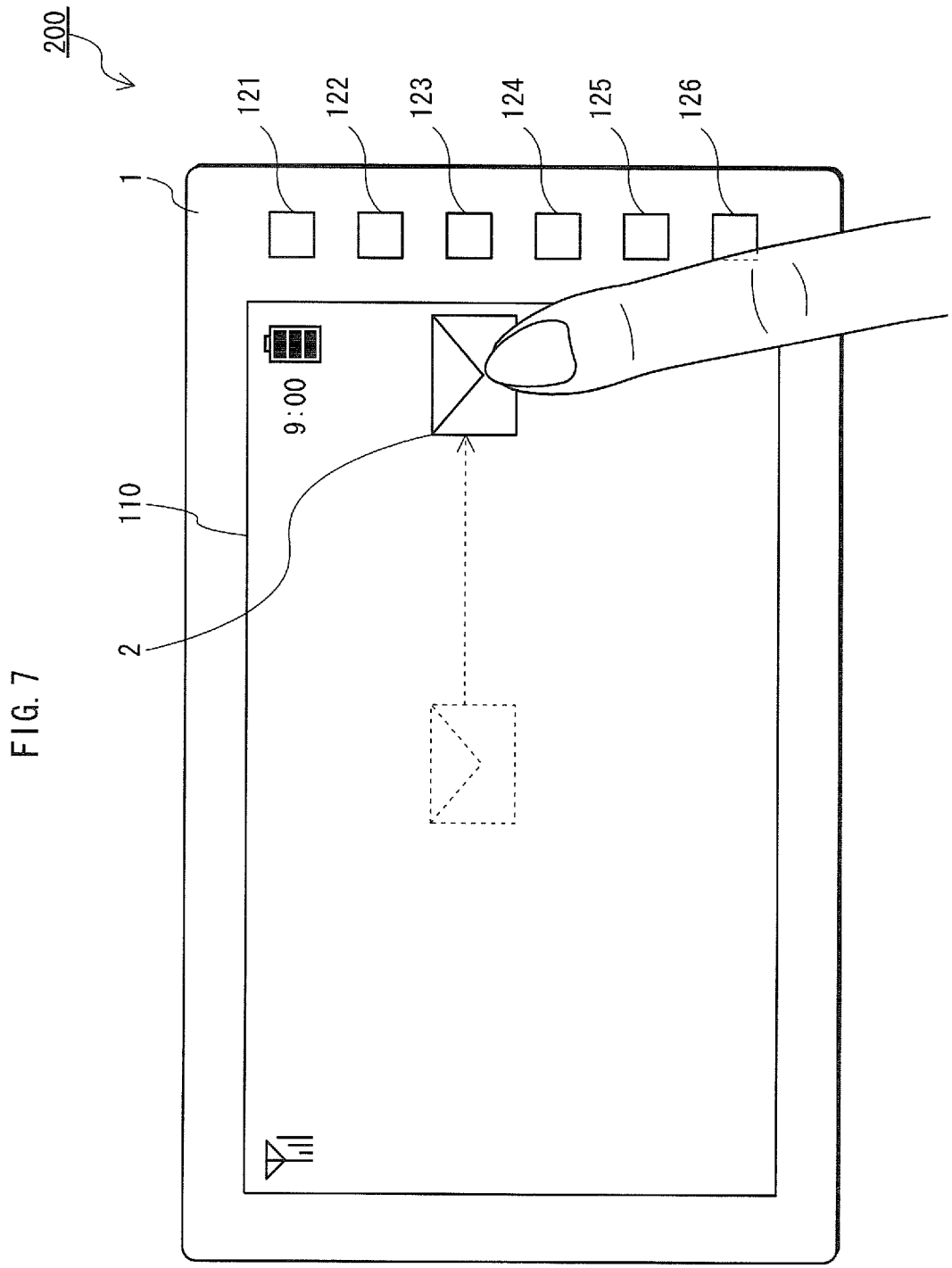

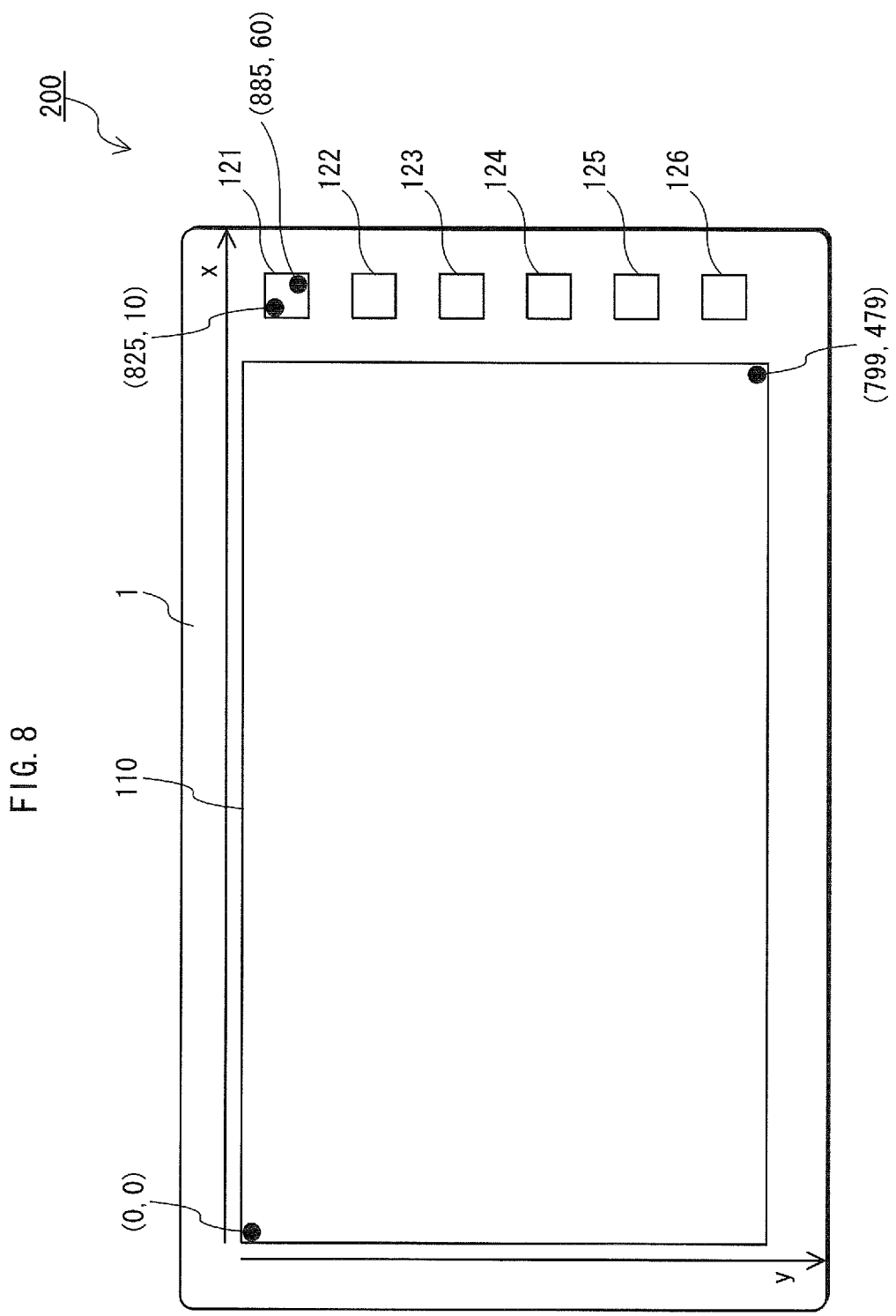

FIG. 9

| Top left coordinate value | Bottom right coordinate value | Key number |
|---|---|---|
| (825, 10) | (885, 60) | 1 |
| (825, 92) | (885, 142) | 2 |
| (825, 174) | (885, 224) | 3 |
| (825, 256) | (885, 306) | 4 |
| (825, 338) | (885, 388) | 5 |
| (825, 420) | (885, 470) | 6 |

FIG. 11

| Coordinate value | Key number |
|---|---|
| (610, 10) | 1 |
| (611, 10) | 1 |
| ... | ... |
| (610, 92) | 2 |
| (611, 92) | 2 |
| ... | ... |
| (610, 174) | 3 |
| (611, 174) | 3 |
| ... | ... |
| (610, 256) | 4 |
| (611, 256) | 4 |
| ... | ... |
| (610, 338) | 5 |
| (611, 338) | 5 |
| ... | ... |
| (610, 420) | 6 |
| (611, 420) | 6 |
| ... | ... |

PORTABLE TERMINAL, INPUT CONTROL PROGRAM, AND INPUT CONTROL METHOD

TECHNICAL FIELD

The present invention relates to a portable terminal, such as a mobile phone, provided with multiple touch-sensitive input devices, and in particular, to a technology for controlling execution of processing that is based on input received by the touch-sensitive input devices.

BACKGROUND ART

In the field of mobile phones, there is a known technology for reducing the risk of processing that is unintended by a user of a mobile phone being executed even in cases where the user has accidentally operated the mobile phone.

For instance, Patent Literature 1 discloses a technology that is applicable to a mobile phone having a speed dial function. In specific, the technology disclosed in Patent Literature 1 allows outgoing calls to be made from a mobile phone only when an off-hook key provided to the mobile phone is depressed within a predetermined time period after one or more keys, which correspond to a number having a smaller number of digits than a typical phone number, are depressed. The application of this technology reduces the risk of unintended outgoing calls being made in cases such as where the mobile phone is disposed in a pocket, a bag or the like, and the keys of the mobile phone are accidentally depressed.

In addition, Patent Literature 2, for instance, discloses a technology of selecting one key from among multiple depressed keys when multiple keys of a mobile phone are depressed simultaneously. According to Patent Literature 2, this selection is performed according to results of past selections performed when the same combination of keys had been depressed. The application of this technology increases the possibility of processing that is intended by a user being executed even when the user has accidentally depressed multiple keys. In other words, the application of this technology reduces the risk of processing that is unintended by a user being executed in such situations.

CITATION LIST

Patent Literature

[Patent Literature 1]
Japanese Patent Application Publication No. 2004-112353
[Patent Literature 2]
Japanese Patent Application Publication No. 2004-355289

SUMMARY OF INVENTION

Technical Problem

In the meantime, portable terminals, such as mobile phones, provided with multiple touch-sensitive input devices are known. For instance, a touch panel may be provided to a portable terminal as one touch-sensitive device, and in addition, a touch key may be provided to the same portable terminal as another touch-sensitive input device. Such a portable terminal provided with multiple touch-sensitive input devices executes processing corresponding to input received by the respective multiple touch-sensitive input devices. That is, one touch-sensitive input device receives input independently from the other.

Accordingly, since the multiple touch-sensitive input devices receive input independently as described above, when a user accidentally operates one touch-sensitive input device provided to a portable terminal while operating the other touch-sensitive input device provided to the same portable terminal, a problem arises that processing corresponding to the accidentally operated touch-sensitive input device, which is unintended by the user, is executed. This problem is very similar to the above-described conventional problem.

However, although the problems may appear to be similar, the technologies presented in Patent Literatures 1 and 2 are not applicable to portable terminals provided with multiple touch-sensitive devices. This is since the technologies presented in Patent Literatures 1 and 2 commonly aim to provide solutions to accidental user operations made with respect to a single input device, such as a ten-key pad.

In view of such problems, the present invention provides a portable terminal provided with multiple touch-sensitive input devices, which is capable of reducing the risk of processing that is unintended by a user being executed.

Solution to Problems

So as to solve the above-presented problems, the portable terminal pertaining to the present invention is a portable terminal including a touch-sensitive first input device and a touch-sensitive second input device that receive input when contact is made thereto, the portable terminal comprising: a first execution unit configured to execute processing that is in accordance with input received by the first input device; a second execution unit configured to execute processing that is in accordance with input received by the second input device; and a control unit that controls whether or not to inhibit the execution of the processing by the second execution unit according to which position on the first input device is contacted.

Advantageous Effects of the Invention

With such a structure, the portable terminal pertaining to the present invention reduces the risk of processing that is unintended by a user being executed.

BRIEF DESCRIPTION OF DRAWINGS

FIG. 4 illustrates a data structure and an example of contents of a region table 10 utilized by the mobile phone 100.

FIG. 7 illustrates one example of a user operation performed with respect to a mobile phone 200 pertaining to embodiment 2.

FIG. 8 is a diagram for explaining a logical coordinate system utilized by the mobile phone 200.

FIG. 9 illustrates a data structure and an example of contents of a region table 20 utilized by the mobile phone 200.

FIG. 11 illustrates a data structure and an example of contents of a region table 15 utilized by a mobile phone pertaining to modification 2.

DESCRIPTION OF EMBODIMENTS

In the following, explanation is provided of a mobile phone as an embodiment of the portable terminal pertaining to the present invention.

Embodiment 1

[Overview]

Figure 1:
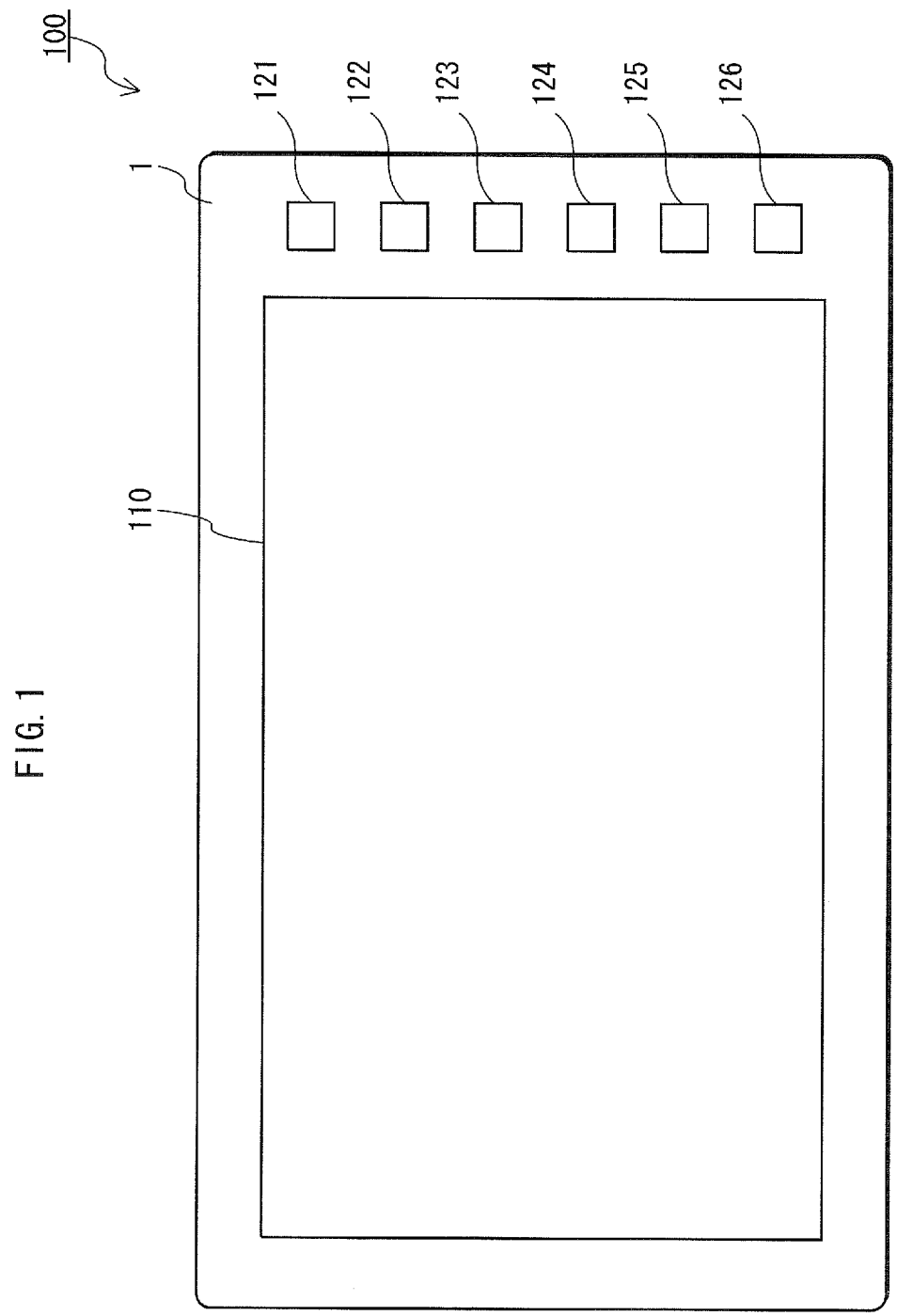
FIG. 1 is a front elevational view illustrating an exterior appearance of a mobile phone 100 pertaining to embodiment 1.

FIG. 1 is a front elevational view illustrating an exterior appearance of a mobile phone 100 pertaining to embodiment 1.

The mobile phone 100 is a straight-type mobile phone including a housing 1; a touch panel 110 arranged on the housing 1; and six touch keys 121 through 126 that are also arranged on the housing 1, as illustrated in FIG. 1.

As illustrated in FIG. 1, the touch keys 121 through 126 are located close to the touch panel 110. Hence, when a user puts a finger or the like in contact with the touch panel 110 to perform a user operation, there is a possibility that the user's finger or the like accidentally comes in contact with the touch keys 121 through 126, along with the touch panel 110. The mobile phone 100 reduces the risk of processing allocated to the touch keys being executed when a user's finger or the like accidentally contacts the touch keys as described above.

Note that the touch keys 121 through 126 are considered as being located close to the touch panel 110 when a user's finger or the like can cover the distance between the location of the touch keys 121 through 126 on the mobile phone 100 and the location of the touch panel 110 on the mobile phone 100.

Figure 2:
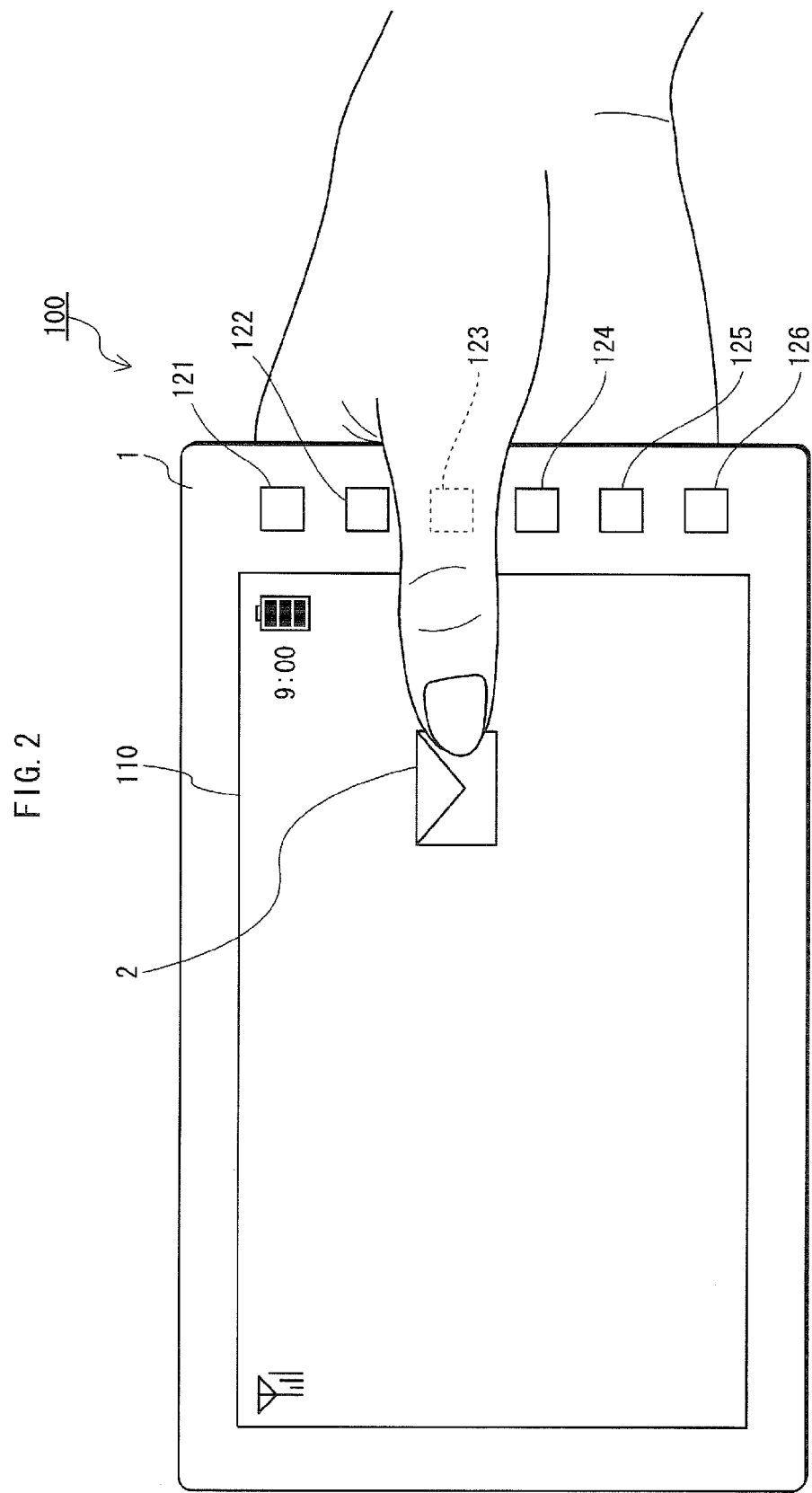
FIG. 2 illustrates one example of a user operation performed with respect to the mobile phone 100.

FIG. 2 illustrates one example of a user operation performed with respect to the mobile phone 100.

In FIG. 2, illustration is provided of an example where a "mail" icon 2 is displayed on a display of the touch panel 110 of the mobile phone 100. In this example, processing for launching a mail application is allocated to the "mail" icon 2. Accordingly, the mail application is launched when a user's finger or the like is put in contact with the "mail" icon 2. Note that in the following, the expression "select an icon" refers to a user operation performed by a user putting a finger or the like in contact with an icon displayed on the display of the touch panel 110.

In addition, a different type of processing is allocated to each of the touch keys 121 through 126. In this example, presumption is made that processing for launching a web browser is allocated to the touch key 123 (illustrated in FIG. 2 as an area surrounded by broken lines, due to being contacted by a user's finger).

Further, for each of the touch keys 121 through 126, the mobile phone 100 stores a coordinate value for a corresponding rectangular region (referred to hereinafter as a "neighboring region") on the touch panel 110. More specifically, a neighboring region is such that, when a neighboring region on the touch panel 110 is contacted, there is a possibility that a corresponding touch key among the touch keys 121 through 126 is also contacted along with the neighboring region. When a neighboring region is contacted, the mobile phone 100 disables execution of processing based on input received by a corresponding touch key for a predetermined time period (for instance, 50 ms). Detailed explanation of the neighboring regions is provided in the following.

By preemptively disabling execution of processing based on input received by a corresponding touch key when a neighboring region on the touch panel 110 is contacted, the following is realized. Even if a user accidentally puts a finger in contact with the touch key 123 while selecting the "mail" icon 2 as illustrated in FIG. 2, the mobile phone 100 executes only the processing of launching the mail application, which is processing that is intended by the user. On the other hand, the mobile phone 100 does not execute the processing of launching the web browser.

Note that in the following, the expression "press a touch key" refers to a user operation performed by a user putting a finger or the like in contact with one of the touch keys 121 through 126 and thereby selecting the touch key.

[Functional Structure]

In the following, explanation is provided of a functional structure of the mobile phone 100, with reference to FIG. 3.

Figure 3:
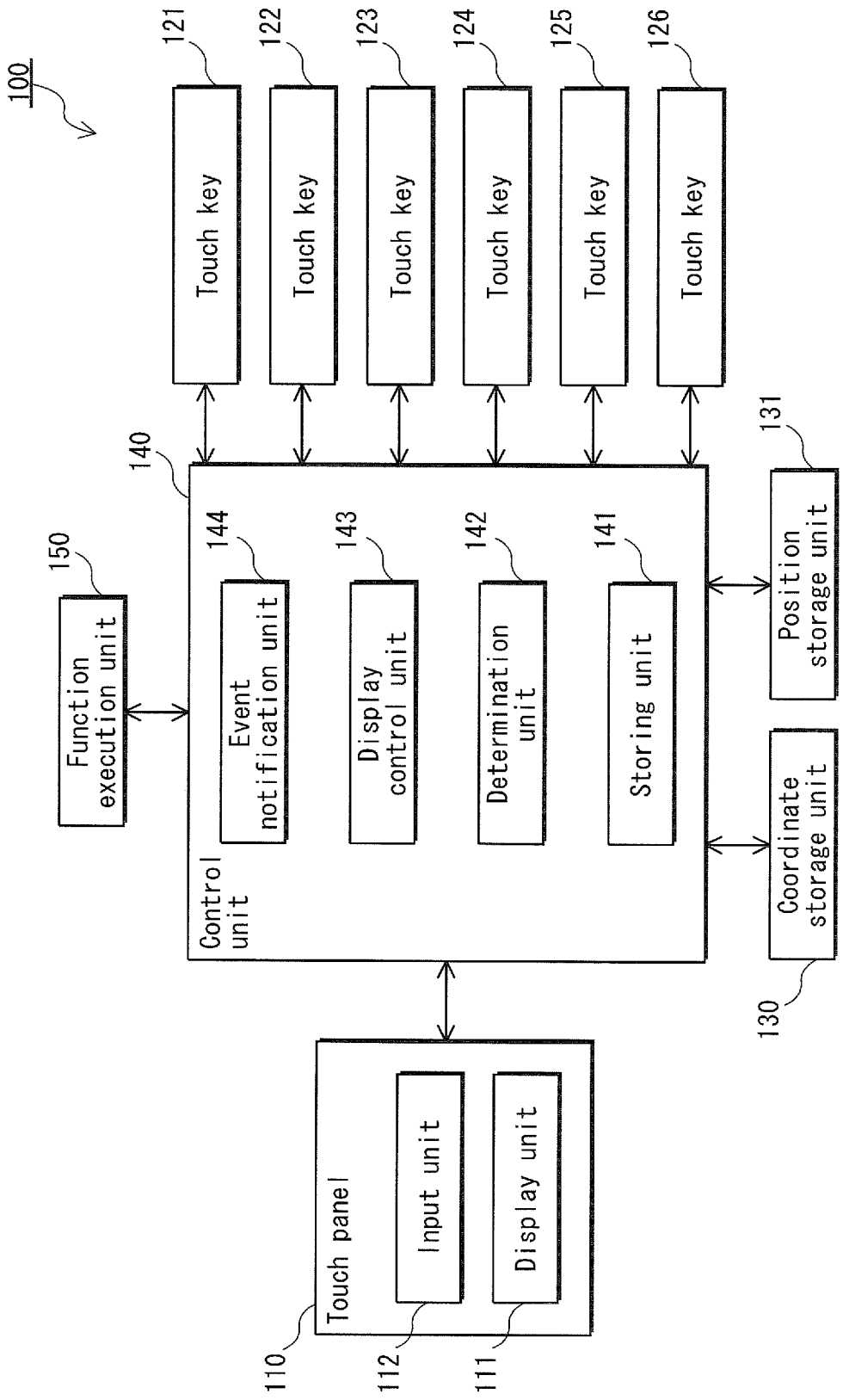
FIG. 3 is a block diagram illustrating a functional structure of main components of the mobile phone 100.

FIG. 3 is a block diagram illustrating the functional structure of main components of the mobile phone 100.

As illustrated in FIG. 3, the mobile phone 100 includes: the touch panel 110; the touch keys 121 through 126; a coordinate storage unit 130; a position storage unit 131; a control unit 140; and a function execution unit 150.

Note that in FIG. 3, illustration of conventional components provided to a mobile phone, such as a communication unit, a speaker, and a microphone, is omitted. In addition, the mobile phone 100 also includes a processor and a memory, and the functions of the control unit 140 and the function execution unit 150 are realized by the processor executing a program stored in the memory.

The touch panel 110 includes a display unit 111 and an input unit 112.

The display unit 111 includes an LCD (Liquid Crystal Display) and is a circuit that displays images such as characters and icons on the LCD according to instructions received from the control unit 140. Here, presumption is made that the LCD has a display resolution (width×height) of 800×480 pixels.

The input unit 112 is a circuit that detects contact made to the touch panel 110 by a user and that, while detecting such contact, transmits, to the control unit 140, a coordinate value (x, y) indicating a contact position on the touch panel 110 to which contact is being made every time a unit time period (for instance, 25 ms) elapses.

In the following, explanation is provided under the presumption that a coordinate value of a top left vertex of the touch panel 110 in FIG. 1 is denoted by (0, 0), whereas a coordinate value of a bottom right vertex of the touch panel 110 in FIG. 1 is denoted by (799, 479). Note that here and in the following, explanation is provided while considering the longitudinal direction of the touch panel 110 in FIG. 1 as the left-right direction of the touch panel 110. Further, the input unit 112 is implemented by using, for instance, an electro-static capacitive touch sensor.

Each of the touch keys 121 through 126 detects contact made by the user and, while detecting such contact, transmits a signal (referred to hereinafter as a "detection signal") indicating that contact is being detected to the control unit 140. Further, each of the touch keys 121 through 126 is implemented by using, for instance, an electrostatic capacitive touch sensor.

The coordinate storage unit 130 is a memory area for storing the coordinate value received from the input unit 112, and the position storage unit 131 is a memory area for storing a region table 10 (refer to FIG. 4), which defines a neighboring region for each of the touch keys 121 through 126.

The control unit 140 includes: a storing unit 141; a determination unit 142; a display control unit 143; and an event notification unit 144. The control unit 140 is provided with functions commonly provided to a mobile phone, and in addition to such common functions, the control unit 140 is particularly provided with a function of controlling whether or not to make a notification of an event (referred to hereinafter as a "Press Key event") to the function execution unit 150 when a detection signal is transmitted from one of the touch keys 121 through 126. A Press Key event for a given touch key indicates that the touch key has been depressed.

The storing unit 141 receives the coordinate value transmitted from the input unit 112 and stores the coordinate value so received to the coordinate storage unit 130.

The determination unit 142 determines whether a contact position on the touch panel 110 indicated by the coordinate value stored to the coordinate storage unit 130 by the storing unit 141 is located within a neighboring region. This determination is made according to the region table 10 stored in the position storage unit 131.

In addition, the determination unit 142 stores information (referred to hereinafter as "disablement information"), for each of the touch keys 121 through 126. The disablement information for a given touch key indicates whether or not execution of processing based on input received by the touch key is disabled (for instance, the disablement information for a given touch key indicates "1" when execution of processing allocated to the touch key is disabled, whereas the disablement information for a given touch key indicates "0" when execution of processing allocated to the touch key is not disabled). The determination unit 142 also performs management of the disablement information.

In specific, the management of the disablement information by the determination unit 142 is performed as described in the following. When determining that a contact position indicated by the coordinate value stored in the coordinate storage unit 130 is located within a neighboring region, the determination unit 142 updates the disablement information for a touch key corresponding to the neighboring region so as to indicate that execution of processing allocated to the touch key is disabled, or in other words, updates the disablement information for the touch key so as to indicate "1". Further, when a predetermined time period (50 ms in this example) elapses after the disablement information is updated as described above, the determination unit 142 updates the disablement information so as to indicate that execution of the processing allocated to the touch key is not disabled, or in other words, updates the disablement information for the touch key so as to indicate "0".

In addition to the above, when receiving a detection signal transmitted from one of the touch keys 121 through 126, the determination unit 142 determines, according to the value of the disablement information for the touch key, whether or not to notify the event notification unit 144 of information (referred to hereinafter as a "key number") indicating the touch key having transmitted the detection signal. Further, when the result of the determination is affirmative, the determination unit 142 notifies the event notification unit 144 of the key number.

The display control unit 143 causes the display unit 111 to display a screen that is in accordance with a result of processing performed by the function execution unit 150.

The event notification unit 144 notifies the function execution unit 150 of (i) an event (referred to hereinafter as a "Press Panel event") indicating that contact on the touch panel 110 has been detected and (ii) the Press Key event. The Press Panel event includes the coordinate value stored to the coordinate storage unit 130 by the storing unit 141, and the Press Key event includes the key number transmitted from the determination unit 142.

The function execution unit 150 executes functions in accordance with the above-described events notified from the event notification unit 144. Further, the function execution unit 150 also performs management of the size, the shape, and the position (a coordinate) of each icon displayed on the display unit 111.

[Data]

In the following, explanation is provided of data utilized by the mobile phone 100, with reference to FIG. 4.

FIG. 4 illustrates a data structure and an example of contents of the region table 10 utilized by the mobile phone 100.

As illustrated in FIG. 4, the region table 10 includes an associated set of information for each neighboring region. A set of information for a given neighboring region includes: a top left coordinate value 11; a bottom right coordinate value 12; and a key number 13.

The region table 10 is preemptively stored to the position storage unit 131 by a manufacturer or the like of the mobile phone 100 and is referred to by the determination unit 142 when performing the above-described determination.

More specifically, a top left coordinate value 11 and a bottom right coordinate value 12 associated with a given neighboring region respectively indicate a coordinate value of a top left vertex and a coordinate value of a bottom right vertex of the neighboring region. A key number 13 associated with a given neighboring region is information identifying a touch key corresponding to the neighboring region. Note that in the following, explanation is provided while presuming that the touch keys 121 through 126 are respectively indicated by key numbers "1" through "6".

For instance, FIG. 4 indicates that a neighboring region having a top left coordinate value "(610, 10)" and a bottom right coordinate value "(690, 60)" corresponds to a touch key indicated by a key number "1" (i.e., the touch key 121).

[Operation]

In the following, explanation is provided of the operation of the mobile phone 100, which is provided with the above-described structure and which utilizes the above-described data, with reference to FIG. 5.

Figure 5:
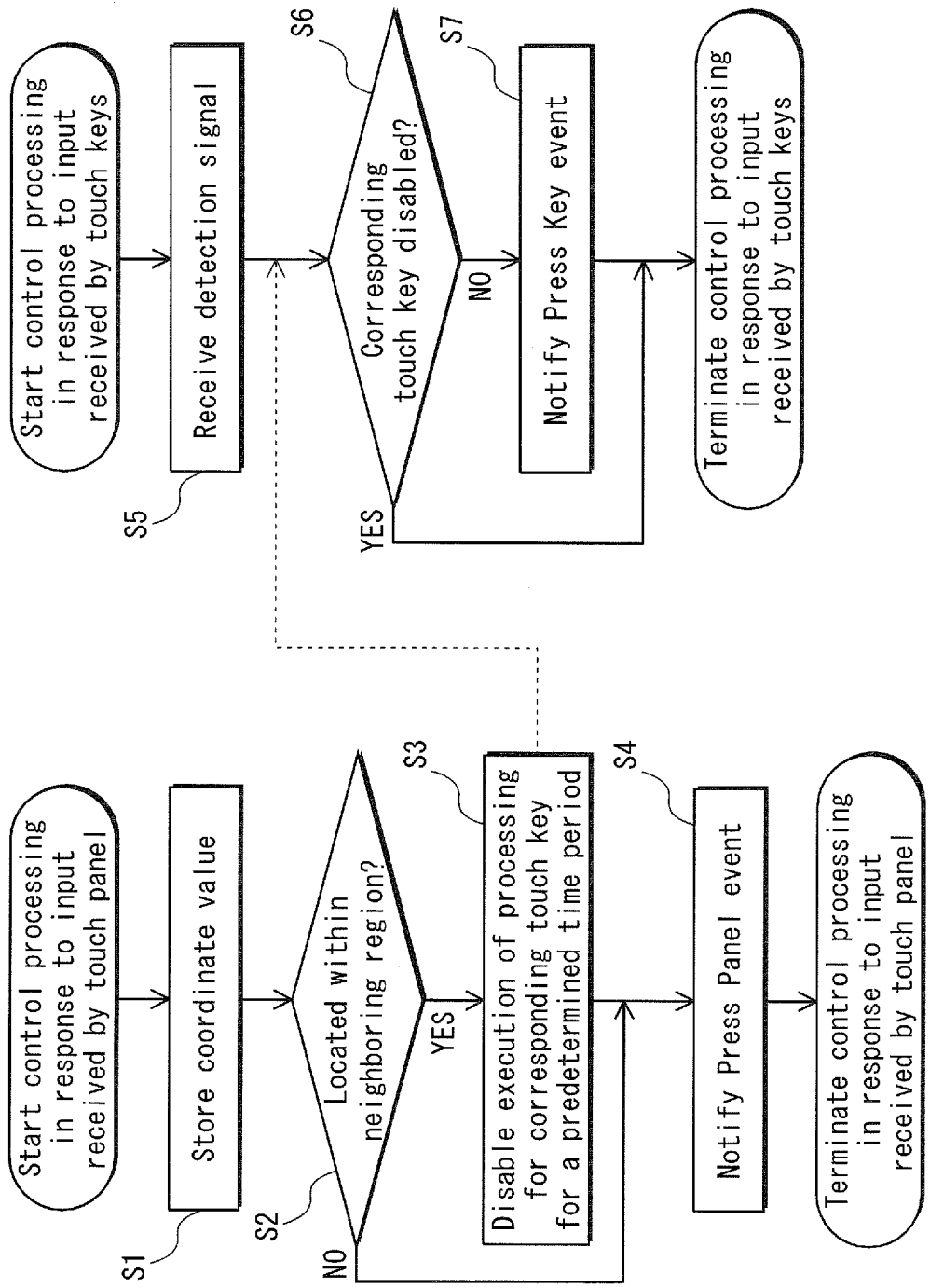
FIG. 5 includes a flowchart illustrating control processing performed by the mobile phone 100 in response to input received by a touch panel 110 and a flowchart illustrating control processing performed by the mobile phone 100 in response to input received by touch keys 121 through 126.

FIG. 5 includes a flowchart illustrating control processing performed by the mobile phone 100 in response to input received by the touch panel 110 and a flowchart illustrating control processing performed by the mobile phone 100 in response to input received by the touch keys 121 through 126.

[Control Processing in Response to Input Received by the Touch Panel]

First, explanation is provided of the control processing performed by the mobile phone 100 in response to input received by the touch panel 110, with reference to the flowchart shown on the left side of FIG. 5.

When receiving a coordinate value transmitted from the input unit 112 of the touch panel 110, the storing unit 141 of the control unit 140 stores the coordinate value so received to the coordinate storage unit 130 (Step S1).

Then, the determination unit 142 of the control unit 140 determines, according to the region table 10, whether or not a contact position on the touch panel 110 indicated by the coordinate value stored in the coordinate storage unit 130 is located within one of the neighboring regions (Step S2).

For instance, when the coordinate value stored in the coordinate storage unit 130 is (650, 200), the contact position indicated by the coordinate value is located within a neighboring region corresponding to a touch key indicated by a key number "3" (i.e., the touch key 123) in the example of the region table 10 illustrated in FIG. 4. Accordingly, the determination unit 142 makes an affirmative determination (Step S2: YES).

On the other hand, when the coordinate value stored in the coordinate storage unit 130 is, for instance, (400, 100), the contact position indicated by the coordinate value is not located within any of the neighboring regions corresponding to the touch keys 121 through 126 in the example of the region table 10 illustrated in FIG. 4. Accordingly, the determination unit 142 makes a negative determination (Step S2: NO).

When determining that the contact position indicated by the coordinate value stored in the coordinate storage unit 130 is located within one of the neighboring regions (Step S2: YES), the determination unit 142 disables execution of processing based on input received by the touch key corresponding to the neighboring region for a predetermined time period (50 ms in this example) (Step S3). More specifically, the determination unit 142 obtains, from the region table 10, a key number of the touch key corresponding to the neighboring region within which the contact position indicated by the coordinate value stored in the coordinate storage unit 130 is located. Then, the determination unit 142 updates the disablement information for the touch key indicated by the key number so as to indicate "1". Further, when the predetermined time period elapses after the disablement information is updated so as to indicate "1", the determination unit 142 updates the disablement information so as to indicate "0".

In the above-described example, when the coordinate value stored in the coordinate storage unit 130 is (650, 200), the determination unit 142 obtains the key number "3" from the region table 10, updates the disablement information for the touch key 123 indicated by the key number "3" so as to indicate "1", and when the predetermined time period elapses, updates the disablement information for the touch key 123 so as to indicate "0".

Upon completion of the processing in Step S3, or when the determination unit 142 determines in Step S2 that the contact position indicated by the coordinate value stored in the coordinate storage unit 130 is not located within any of the neighboring regions (Step S2: NO), the event notification unit 144 notifies the function execution unit 150 of a Press Panel event including the coordinate value stored in the coordinate storage unit 130 (Step S4). Upon completion of Step S4, the mobile phone 100 terminates the control processing in response to input received by the touch panel 110.

Note that following this point, the function execution unit 150 executes a function corresponding to the coordinate value included in the Press Panel event, and the display control unit 143 causes the display unit 111 to display a screen that is in accordance with the result of the execution.

In the above-described example, when the coordinate value stored in the coordinate storage unit 130 is (650, 200) and the "mail" icon 2 illustrated in FIG. 2 is displayed in a region on the touch panel 110 including the contact position indicated by the coordinate value, the function execution unit 150 executes the processing of launching the mail application, and the display control unit 143 causes the display unit 111 to display a mail application screen.

[Control Processing in Response to Input Received by the Touch Keys]

Subsequently, explanation is provided of the control processing performed by the mobile phone 100 in response to input received by the touch keys 121 through 126, with reference to the flowchart shown on the right side of FIG. 5.

When receiving a detection signal from one of the touch keys 121 through 126 (Step S5), the determination unit 142 determines, according to the disablement information for the touch key, whether or not execution of processing based on input received by the touch key is disabled (Step S6).

In specific, the determination unit 142 makes an affirmative determination when the disablement information for the touch key having transmitted the detection signal indicates "1" (Step S6: YES), whereas the determination unit 142 makes a negative determination when the disablement information for the touch key indicates "0" (Step S6: NO).

When it is determined in Step S6 that execution of the processing based on input received by the touch key having transmitted the detection signal is disabled (Step S6: YES), the mobile phone 100 does not perform any processing and terminates the control processing in response to input received by the touch keys 121 through 126. In contrast, when it is determined in Step S6 that execution of the processing based on input received by the touch key having transmitted the detection signal is not disabled (Step S6: NO), the determination unit 142 notifies the event notification unit 144 of the key number of the touch key, and the event notification unit 144 notifies the function execution unit 150 of a Press Key event including the key number transmitted from the determination unit 142 (Step S7). Upon completion of Step S7, the mobile phone 100 terminates the control processing in response to input received by the touch keys 121 through 126.

Note that following this point, the function execution unit 150 executes the processing allocated to the touch key indicated by the key number included in the Press Key event, and the display control unit 143 causes the display unit 111 to display a screen that is in accordance with the result of the execution.

For instance, when the key number included in the Press Key event is "3", the touch key indicated by the key number "3" is the touch key 123. Since, in this example, the processing for launching the web browser is allocated to the touch key 123, the function execution unit 150 executes the processing of launching the web browser, and the display control unit 143 causes the display unit 111 to display a web browser screen.

[Modification 1]

In embodiment 1, explanation is provided of a method of preemptively disabling execution of processing based on input received by a touch key for a predetermined time period when contact has been made to a neighboring region on the touch panel 110 corresponding to the touch key. This method reduces the risk of processing corresponding to an accidentally depressed touch key being executed.

In the following, explanation is provided of one modification of embodiment 1 providing an alternative method for reducing the risk of processing corresponding to an accidentally depressed touch key being executed. In this modification of embodiment 1, switching between execution and non-execution of processing allocated to a touch key having received input is performed according to whether or not a corresponding neighboring region on the touch panel 110 has been contacted within a predetermined time period up to the time point at which input is received by the touch key.

A mobile phone pertaining to modification 1 is yielded by slightly changing the functions provided to the storing unit 141 and the determination unit 142 of the mobile phone 100 pertaining to embodiment 1. Therefore, explanation is provided in the following while mainly focusing on such changes.

[Operation]

In the following, explanation is provided of the operation of the mobile phone pertaining to modification 1, with reference to the accompanying FIGS. 6A and 6B.

Figure 6B:
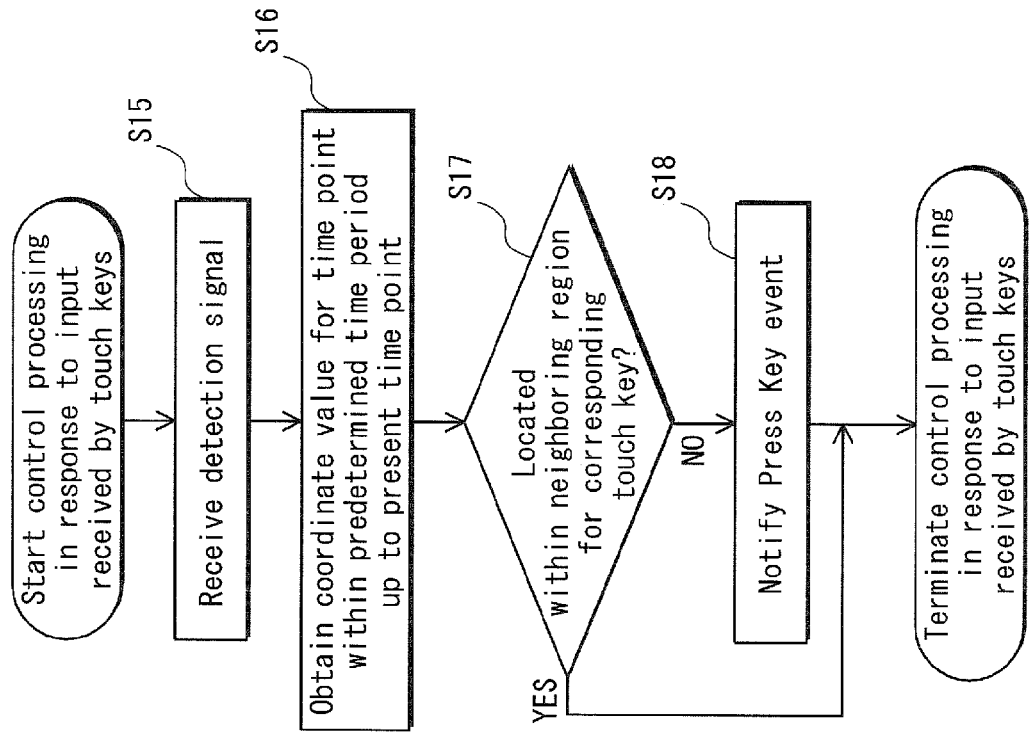
FIG. 6B is a flowchart illustrating control processing performed by the mobile phone pertaining to modification 1 in response to input received by the touch keys 121 through 126.
Figure 6A:
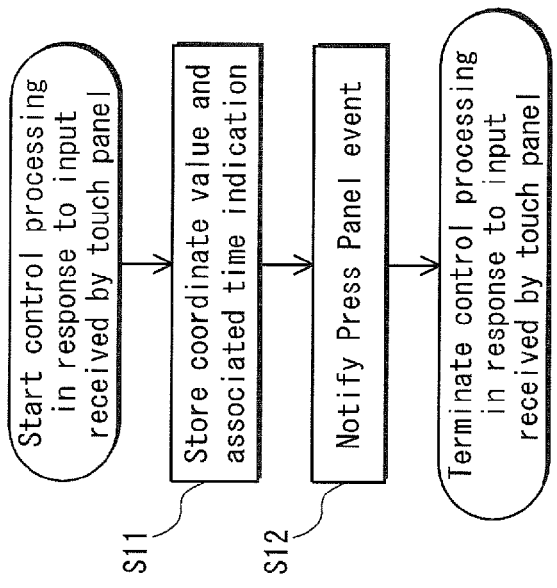
FIG. 6A is a flowchart illustrating control processing performed by a mobile phone pertaining to modification 1 in response to input received by the touch panel 110.

FIG. 6A is a flowchart illustrating control processing performed by the mobile phone pertaining to modification 1 in response to input received by the touch panel 110, and FIG. 6B is a flowchart illustrating control processing performed by the mobile phone pertaining to modification 1 in response to input received by the touch keys 121 through 126.

[Control Processing in Response to Input Received by the Touch Panel]

First, explanation is provided of the control processing performed by the mobile phone pertaining to modification 1 in response to input received by the touch panel 110, with reference to the flowchart shown in FIG. 6A.

A storing unit pertaining to modification 1 receives a coordinate value transmitted from the input unit 112 of the touch panel 110. Upon receiving the coordinate value, the storing unit pertaining to modification 1 associates the coordinate value so received with an indication of a time point at which the coordinate value is received and stores the coordinate value and the associated time indication to the coordinate storage unit 130 (Step S11). Note that the time indication is yielded by using a value (for instance, a value indicating time in units of milliseconds) that can be timely obtained from an undepicted timer.

The event notification unit 144 notifies the function execution unit 150 of a Press Panel event including the coordinate value stored in the coordinate storage unit 130 as in Step S4 in FIG. 5 (Step S12). Following the completion of Step S12, the mobile phone pertaining to modification 1 terminates the control processing in response to input received by the touch panel 110.

Note that, as explanation has already been provided in embodiment 1, following this point, the function execution unit 150 executes a function in accordance with the coordinate value included in the Press Panel event, and the display control unit 143 causes the display unit 111 to display a screen that is in accordance with the result of the execution.

[Control Processing in Response to Input Received by the Touch Keys]

Subsequently, explanation is provided of the control processing performed by the mobile phone pertaining to modification 1 in response to input received by the touch keys 121 through 126, with reference to the flowchart shown in FIG. 6B.

When receiving a detection signal from one of the touch keys 121 through 126 (Step S15), as in Step S5 of the control processing (refer to FIG. 5) in response to input received by the touch keys 121 through 126 of the mobile phone 100 pertaining to embodiment 1, a determination unit pertaining to modification 1 obtains a coordinate value from the coordinate storage unit 130 (Step S16). Here, the coordinate value obtained is associated with a time indication indicating a time point within a predetermined time period (50 ms, for instance) up to the present time point. Note that, as already mentioned in the above, the present time point is yielded by using a value that can be timely obtained from an undepicted timer.

The determination unit pertaining to modification 1 further determines, according to the region table 10, whether or not a contact position indicated by the coordinate value obtained is located within a neighboring region corresponding to the touch key having transmitted the detection signal received in Step S15 (Step S17).

For instance, when the coordinate value obtained from the coordinate storage unit 130 is (650, 200) and the detection signal is transmitted from the touch key 123, the contact position indicated by the coordinate value is located within a neighboring region (having a top left coordinate value (610, 174) and a bottom right coordinate value (690, 224)) corresponding to the key number "3" in the example of the region table 10 illustrated in FIG. 4. Accordingly, the determination unit pertaining to modification 1 makes an affirmative determination (Step S17: YES).

On the other hand, for instance, when the coordinate value obtained from the coordinate storage unit 130 is (650, 200) and the detection signal is transmitted from the touch key 121, the determination unit pertaining to modification 1 makes a negative determination since the contact position indicated by the coordinate value is not located within a neighboring region corresponding to the key number "1" in the example of the region table 10 illustrated in FIG. 4 (Step S17: NO). Note that, when a coordinate value is not obtained in Step 16 due to a coordinate value associated with a time indication indicating a time point within a predetermined time period up to the present time point not existing in the coordinate storage unit 130, the determination unit pertaining to modification 1 makes a negative determination (Step S17: NO).

When it is determined in Step S17 that the contact position indicated by the coordinate value obtained is located within the neighboring region corresponding to the touch key having transmitted the detection signal (Step S17: YES), the mobile phone pertaining to modification 1 does not perform any processing and terminates the control processing in response to input received by the touch keys 121 through 126. In contrast, when it is determined in Step S17 that the contact position indicated by the coordinate value obtained is not located within the neighboring region corresponding to the touch key having transmitted the detection signal (Step S17: NO), the determination unit pertaining to modification 1 notifies the event notification unit 144 of the key number of the touch key having transmitted the detection signal, and the event notification unit 144 notifies the function execution unit 150 of a Press Key event (Step S18). Upon completion of Step S18, the mobile phone pertaining to modification 1 terminates the control processing in response to input received by the touch keys 121 through 126.

As explanation has been already provided in embodiment 1 above, following this point, the function execution unit 150 executes the processing allocated to the touch key indicated by the key number included in the Press Key event, and the display control unit 143 causes the display unit 111 to display a screen that is in accordance with the result of the execution.

Embodiment 2

In embodiment 1, explanation is provided of a method for reducing the risk of processing corresponding to an accidentally depressed touch key, among the touch keys 121 through 126, being executed when a user accidentally depresses a touch key when putting a finger or the like in contact with the touch panel 110 so as to select an icon or the like.

In the following, explanation is provided of a method for reducing the risk of processing corresponding to an accidentally depressed touch key, among the touch keys 121 through 126, being executed when a user accidentally depresses a touch key while performing a user operation (a so-called "drag operation") of putting a finger or the like in contact with the touch panel 110 and moving a contact position on the touch panel 110 while maintaining the contact as illustrated in FIG. 7.

A mobile phone 200 pertaining to embodiment 2 is yielded by (i) changing the function provided to the storing unit 141 of the mobile phone 100 pertaining to embodiment 1 so as to be similar to the function of the storing unit pertaining to modification 1, (ii) slightly changing the function provided to the determination unit 142 of the mobile phone 100, and (iii) slightly changing the contents of the region table 10. Therefore, explanation is provided in the following while mainly focusing on such changes.

[Logical Coordinate System]

In the following, explanation is provided of a logical coordinate system utilized by the mobile phone 200.

FIG. 8 is a diagram for explaining the logical coordinate system utilized by the mobile phone 200.

As illustrated in FIG. 8, the logical coordinate system is a coordinate system defined by setting the coordinate of the top left vertex of the touch panel 110 as (0, 0). Further, the logical coordinate system includes an X axis extending from (0, 0) towards the right direction of the touch panel 110, and a Y axis extending from (0, 0) towards the left direction of the touch panel 110 in FIG. 8.

Examples of coordinate values in the logical coordinate system are illustrated in FIG. 8. The coordinate value of the bottom right vertex of the touch panel 110 is (799, 479), the coordinate value of the top left vertex of the touch key 121 is (825, 10), and the coordinate value of the bottom right vertex of the touch key 121 is (885, 60). Note that the coordinate values of the top left and bottom right vertices of the touch key 121 are determined according to the location of the touch key 121 on the housing 1.

Further, a rectangular region specified by top left and bottom right vertices of a given touch key is referred to hereinafter as a "key region" of the touch key. A key region is specified for each of the touch keys 121 through 126.

Note that although the coordinate values of the top left and bottom right vertices of the touch key 121 are illustrated in FIG. 8 for the sake of specifying a key region of the touch key 121, coordinate values of top left and bottom right vertices of a key region for each of the rest of the touch keys (i.e., touch keys 122 through 126) are also determined according to a location of each of the rest of the touch keys on the housing 1. Note that, the location of a given touch key on the housing 1 is specified with respect to the coordinate of the top left vertex of the touch panel 110.

[Data]

In the following, explanation is provided of data utilized by the mobile phone 200, with reference to FIG. 9.

FIG. 9 illustrates a data structure and an example of contents of a region table 20 utilized by the mobile phone 200.

The region table 20 includes an associated set of information for each of the key regions as illustrated in FIG. 9. A set of information for a given key region includes: a top left coordinate value 21; a bottom right coordinate value 22; and a key number 23.

The region table 20 is preemptively stored to the position storage unit 131 by the manufacturer or the like of the mobile phone 200 and is referred to by a determination unit pertaining to embodiment 2 when making a determination as described in the following.

In the region table 20, a top left coordinate value 21 and a bottom right coordinate value 22 associated with a given key region respectively indicate a coordinate value of a top left vertex and a coordinate value of a bottom right vertex of the key region. A key number 23 associated with a given key region is information identifying a touch key corresponding to the key region.

For instance, FIG. 9 indicates that a key region having a top left coordinate value "(825, 10)" and a bottom right coordinate value "(885, 60)" corresponds to a touch key indicated by a key number "1" (i.e., the touch key 121).

[Operation]

In the following, explanation is provided of the operation of the mobile phone 200, with reference to FIG. 10.

Figure 10:
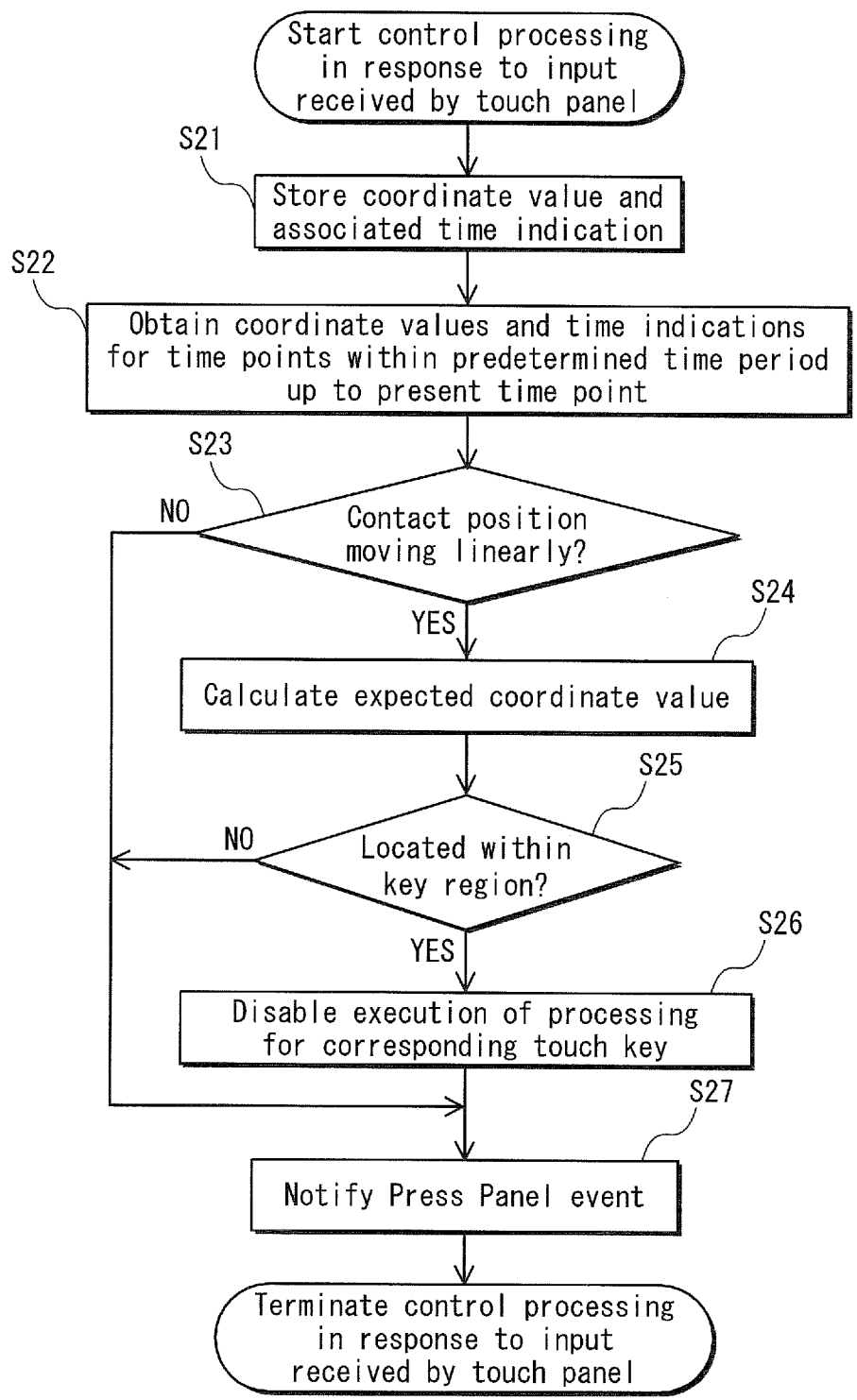
FIG. 10 is a flowchart illustrating control processing performed by the mobile phone 200 in response to input received by the touch panel 110.

FIG. 10 is a flowchart illustrating control processing performed by the mobile phone 200 in response to input received by the touch panel 110.

Note that in the following, explanation concerning control processing performed by the mobile phone 200 in response to input received by the touch keys 121 through 126 is omitted. This is since the control processing performed by the mobile phone 200 in response to input received by the touch keys 121 through 126 is similar to the control processing performed by the mobile phone 100 pertaining to embodiment 1 in response to input received by the touch keys 121 through 126, explanation of which has been provided with reference to the flowchart illustrated on the right side of FIG. 5.

A storing unit pertaining to embodiment 2 receives a coordinate value transmitted from the input unit 112 of the touch panel 110. Upon receiving the coordinate value, the storing unit pertaining to embodiment 2 associates the coordinate value so received with an indication of a time point at which the coordinate value is received and stores the coordinate value and the associated time indication to the coordinate storage unit 130 (Step S21). This processing is similar to the processing in Step S11 in FIG. 6.

A determination unit pertaining to embodiment 2 obtains coordinate values and associated time indications from the coordinate storage unit 130 (Step S22). Here, the coordinate values that are obtained are each associated with a time indication indicating a time point within a predetermined time period (100 ms, for instance) up to the present time point.

Further, the determination unit pertaining to embodiment 2 determines, according to the pairs of coordinate values and associated time indications so received, whether or not a contact position on the touch panel 110 is moving linearly (Step S23).

More specifically, the determination unit pertaining to embodiment 2 generates functions according to each of the pairs of coordinate values and associated time indications obtained. Here, the generation of functions by the determination unit pertaining to embodiment 2 refers to calculating constants a1, a2, b1, and b2 in the functions: $x=a1 \times t+b1$ and $y=a2 \times t+b2$, where the variable t denotes time. The calculation of the constants a1, a2, b1, and b2 is performed by utilizing a common regression analysis method. For instance, the regression analysis method utilized may be the least squares method.

The determination unit pertaining to embodiment 2 determines, for a given pair of a coordinate value and an associated time indication, (i) whether or not a difference between an x coordinate value obtained by substituting the time indication for the variable t in the generated function ($x=a1 \times t+b1$) and the x coordinate of the coordinate value is within a predetermined value (for instance, 10) and (ii) whether or not a y coordinate value obtained by substituting the time indication for the variable t in the generated function (y=a2×t+b2) and the y coordinate of the coordinate value is within a predetermined value (for instance, 10). This determination is performed with respect to each of the pairs of coordinate values and associated time indications, and the determination unit pertaining to embodiment 2 determines that the contact position on the touch panel 110 is moving linearly when an affirmative determination is made for all of the pairs of coordinate values and associated time indications (Step S23: YES).

Note that, when it is determined in Step S22 that a coordinate value associated with a time indication indicating a time point within the predetermined time period up to the present time point does not exist, or that only one coordinate value exists that is associated with a time indication indicating a time point within the predetermined time period up to the present time point, the determination unit pertaining to embodiment 2 determines that the contact position on the touch panel 110 is not moving linearly (Step S23: NO).

When determining that the contact position on the touch panel 110 is moving linearly (Step S23: YES), the determination unit pertaining to embodiment 2 calculates a coordinate value (referred to hereinafter as an "estimated coordinate value") indicating a position of the contact position at a time point later, by a unit time period (25 ms in this example), than the latest time point indicated by the associated time indications obtained (Step S24). In specific, the calculation of the estimated coordinate value is performed by substituting the time point later, by the unit time period, than the latest time point for the variable t in the functions generated.

Following this, the determination unit pertaining to embodiment 2 determines, according to the region table 20, whether or not the position on the touch panel 110 indicated by the estimated coordinate value so calculated is located within one of the key regions (Step S25).

For instance, when the estimated coordinate value is (830, 200), the determination unit pertaining to embodiment 2 makes an affirmative determination since the position indicated by the estimated coordinate value is located within a key region corresponding to the touch key 123 in the example of the region table 20 illustrated in FIG. 9 (Step S25: YES).

When determining that the position indicated by the estimated coordinate value so calculated is located within one of the key regions (Step S25: YES), the determination unit pertaining to embodiment 2 disables execution of processing in response to input received by the touch key corresponding to the key region within which the position indicated by the estimated coordinate value is located for a predetermined time interval (50 ms in this example) (Step S26). This processing is similar to the processing in Step S3 in FIG. 5.

Further, (i) when the processing in Step S26 is completed, (ii) when it is determined in Step S23 that the contact position on the touch panel 110 is not moving linearly (Step S23: NO), or (iii) when it is determined in Step S25 that the position indicated by the estimated coordinate value is not included within any of the key regions (Step S25: NO), the event notification unit 144 notifies the function execution unit 150 of a Press Panel event as in Step S4 in FIG. 5 (Step S27). Following the completion of Step S27, the mobile phone 200 terminates the control processing in response to input received by the touch panel 110.

Note that, as explanation has already been provided in embodiment 1 above, following this point, the function execution unit 150 executes a function in accordance with the coordinate value included in the Press Panel event, and the display control unit 143 causes the display unit 111 to display a screen that is in accordance with the result of the execution.

(Supplement)

Although explanation is provided in the above of the portable terminal pertaining to the present invention based on embodiment 1, modification 1, and embodiment 2 (referred to hereinafter simply as "embodiments"), it is to be understood that the present invention is not limited to the mobile phones as explanation is provided in the embodiments, and modifications as introduced below can be made.

(1) In embodiment 1, explanation is provided that the region table 10 defines a neighboring region for each of the touch keys by utilizing a top left coordinate value and a bottom right coordinate value of each neighboring region. However, the present invention is not limited to this, and a neighboring region may be defined by utilizing a coordinate value of each point included within the neighboring region. In the following, a mobile phone utilizing a modified region table 15, which defines a neighboring region by utilizing a coordinate value of each point included within the neighboring region, is referred to as a mobile phone pertaining to modification 2.

FIG. 11 illustrates a data structure and an example of contents of the region table 15 utilized by the mobile phone pertaining to modification 2.

The region table 15 includes an associated set of information for each of the points composing the neighboring regions as illustrated in FIG. 11. A set of information for a given point includes a coordinate value 16 and a key number 17.

In the region table 15 illustrated in FIG. 11, a coordinate value 16 for a corresponding point indicates a coordinate value of the point, and a key number 17 for a corresponding point is information identifying the touch key corresponding to the neighboring region that the point is included within. Note that a key number 17 in the region table 15 is similar to a key number 13 in the region table 10, explanation of which is provided in embodiment 1.

For instance, FIG. 11 indicates that a point indicated by the coordinate value "(610, 10)" is included within a neighboring region corresponding to a touch key indicated by a key number "1" (i.e., the touch key 121).

Note that the mobile phone pertaining to modification 2 is required to perform the determination in Step S2 of the control processing in response to input received by the touch panel 110 in the manner explained in the following. Here, the determination in Step S2 of the control processing in response to input received the touch panel 110 involves determining, according to the region table 15, whether or not a contact position on the touch panel 110 indicated by the coordinate value stored in the coordinate storage unit 130 is located within one of the neighboring regions, as explanation has already been provided in the above with reference to the flowchart illustrated in the left side on FIG. 5.

That is, a determination unit of the mobile phone pertaining to modification 2 makes an affirmative determination when a coordinate value matching the coordinate value stored in the coordinate storage unit 130 is registered to the region table 15, whereas the determination unit of the mobile phone pertaining to modification 2 makes a negative determination when a coordinate value matching the coordinate value stored in the coordinate storage unit 130 is not registered to the region table 15.

(2) In embodiment 1, explanation is provided that the region table 10 defines the neighboring regions such that (i) the neighboring regions and the touch keys correspond on a one-to-one basis, (ii) the neighboring regions have uniform sizes, and (iii) the neighboring regions do not overlap with each other. However, the present invention is not limited to this, and (i) multiple neighboring regions may be associated with one touch key, (ii) the neighboring regions may each have different sizes, and (iii) the neighboring regions may overlap with each other either entirely or partially.

Further, the coordinate values indicating the neighboring regions defined by the region table 10 (refer to FIG. 4) and the region table 15 (refer to FIG. 11), and the coordinate values indicating the key regions defined by the region table 20 (refer to FIG. 9) are examples provided for the sake of exemplification and may be replaced with other values.

Further, although it is explained in the embodiments that the region tables are preemptively stored to the mobile phones pertaining to the embodiments by the manufacturers or the like of the mobile phones, the present invention is not limited to this. That is, the region tables may be set by a user, or may be set according to results of several user operations that a user is urged to perform when initially using the mobiles phones pertaining to the embodiments.

(3) The mobile phone 200 pertaining to embodiment 2 may be modified so as to be similar to the mobile phone pertaining to modification 1.

In the following, the mobile phone 200 pertaining to embodiment 2 that is modified so as to be similar to the mobile phone pertaining to modification 1 is referred to as a mobile phone pertaining to modification 3. Further, explanation is provided in the following of control processing performed by the mobile phone pertaining to modification 3 in response to input received by the touch keys 121 through 126, with reference to FIG. 12.

Figure 12:
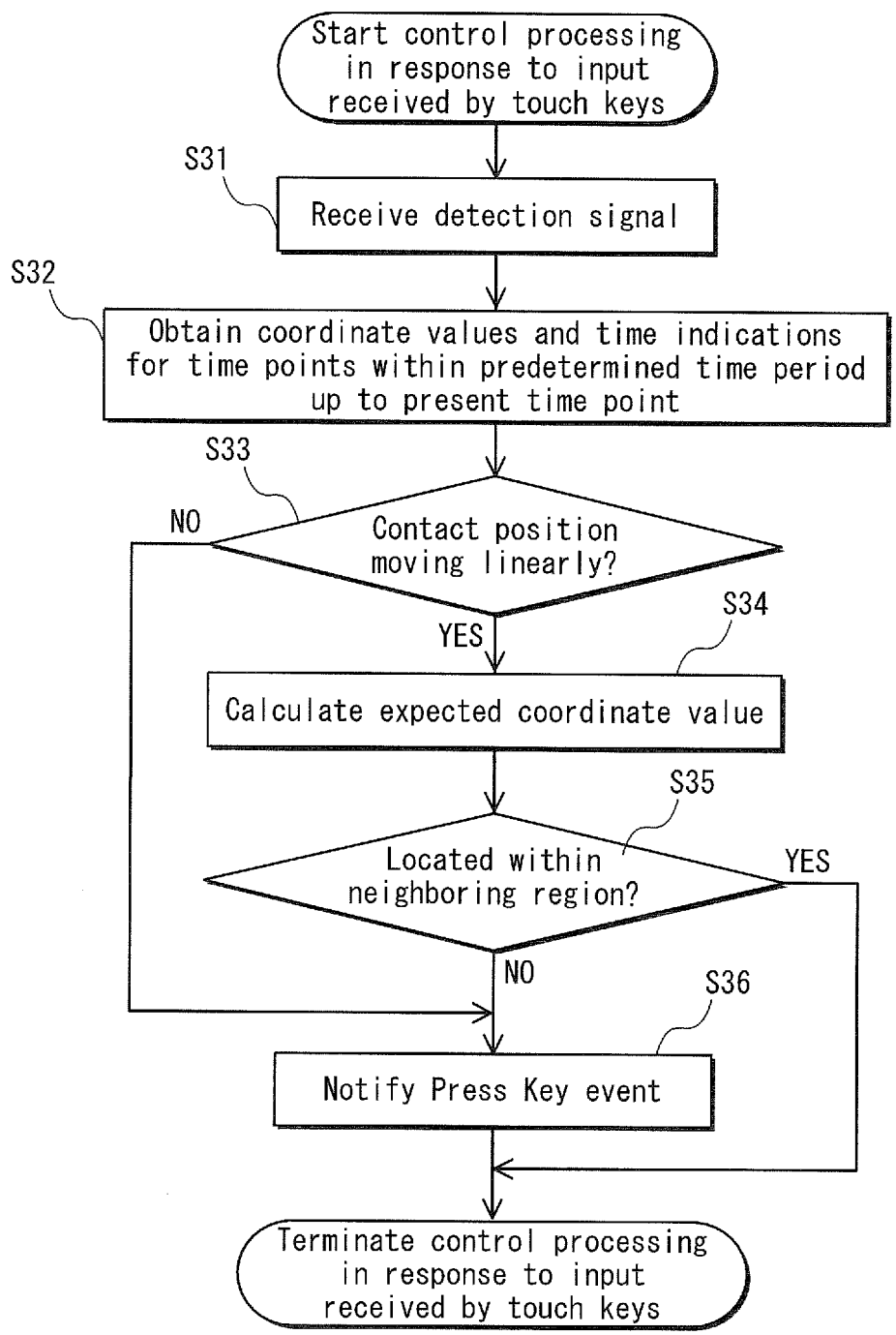
FIG. 12 is a flowchart illustrating control processing performed by a mobile phone pertaining to modification 3 in response to input received by the touch keys 121 through 126.

FIG. 12 is a flowchart illustrating control processing performed by the mobile phone pertaining to modification 3 in response to input received by the touch keys 121 through 126.

Note that in the following, explanation concerning control processing performed by the mobile phone pertaining to modification 3 in response to input received by the touch panel 110 is omitted. This is since the control processing performed by the mobile phone pertaining to modification 3 in response to input received by the touch panel 110 is similar to the control processing performed by the mobile phone pertaining to modification 1 in response to input received by the touch panel 110, explanation of which is provided with reference to the flowchart illustrated in FIG. 6A.

As illustrated in FIG. 12, when receiving a detection signal from one of the touch keys 121 through 126 (Step S31 in FIG. 12) as in Step S15 in FIG. 6, the mobile phone pertaining to modification 3 performs processing that is similar to the processing in Steps S22 through S24 in FIG. 10 and Step S17 in FIG. 6. That is, the mobile phone pertaining to modification 3 obtains pairs of coordinate values and associated time indications (Step S32), determines whether or not a contact position on the touch panel 110 is moving linearly (Step S33), calculates an estimated coordinate value (Step S34), and determines whether or not a position indicated by the estimated coordinate value is included within a neighboring region corresponding to the touch key having transmitted the detection signal (Step S35).

When it is determined in Step S33 that the contact position on the touch panel 110 is not moving linearly (Step S33: NO), or when it is determined in Step S35 that the position indicated by the estimated coordinate value is not included within the neighboring region of the touch key detected in Step S31 (Step S35: NO), the function execution unit 150 is notified of a Press Key event (Step S36). On the other hand, when it is determined in Step S35 that the position indicated by the estimated coordinate value is included within the neighboring region of the touch key detected in Step S31 (Step S35: YES), the control processing in response to input received by the touch keys 121 through 126 is terminated without the function execution unit 150 being notified of a Press Key event.

(4) In embodiment 2, explanation is provided that, in Step S23 of the flowchart in FIG. 10, the determination of whether or not the contact position is moving linearly is performed according to functions generated by using the least squares method. However, the method for determining whether or not the contact position is moving linearly is not limited to the above-described method, and other methods may be applied as well. For instance, the determination of whether or not the contact position is moving linearly may be performed by generating functions by only using coordinate values associated with time indications indicating the earliest and latest time points among the coordinate values obtained in Step S22, and by further determining whether or not a difference between (i) each of the rest of the coordinate values obtained in Step S22 and (ii) a corresponding coordinate value obtained by using the functions so generated is within a predetermined value. More specifically, the corresponding coordinate value is obtained by associating the functions with a time point at which a corresponding one of the rest of the coordinate values is obtained.

In addition, in the explanation concerning Step S23 in the flowchart indicated in FIG. 10, explanation is provided that "10" is one example of the predetermined value used when determining, for a given pair of a coordinate value and an associated time indication, (i) whether or not a difference between an x coordinate value obtained by substituting the time indication for the variable t in the generated function ($x=a1 \times t+b1$) and the x coordinate of the coordinate value is within the predetermined value and (ii) whether or not a difference between a y coordinate value obtained by substituting the time indication for the variable t in the generated function ($y=a2 \times t+b2$) and the y coordinate of the coordinate value is within the predetermined value. However, the predetermined value is not limited to "10", and other values may also be used. For instance, modification may be performed such that a user is able to set a desired value as the predetermined value, or the predetermined value may be set according to results of several drag operations that a user is urged to perform when initially using the mobiles phone pertaining to the embodiments. Further, different values may be used as the predetermined value for the x coordinate value and the predetermined value for the y coordinate value.

(5) In the embodiments, explanation is provided that the mobile phones pertaining to the embodiments are straight-type terminals. However, the present invention is not limited to this, and the mobile phones may be mobile phones having other external appearances, such as a slide-type mobile phone.

(6) In the embodiments, explanation is provided that the input unit 112 of the touch panel 110 pertaining to the embodiments is implemented by using an electrostatic capacitive touch sensor. Here, as the electrostatic capacitive touch sensor for implementing the input unit 112 of the touch panel 110, an appropriate type is to be selected from various types of capacitive touch sensors. Types of touch sensors include: a projected capacitance touch sensor, which includes multiple electrode patterns formed on a substrate composed of plastic, glass or the like and which can detect contact made to positions thereof by measuring ratios of amperages between different electrode patterns in the vicinity of the contact position; a surface capacitance touch sensor, which includes a conductive layer, a substrate, and electrodes provided to the edges of the substrate, in which a uniform electrostatic field is formed by the conductive layer, and the contact position is detected by measuring a ratio between the amperages of the electrodes caused by the contact made thereto by a finger or the like.

In addition, the input unit 112 of the touch panel 110 is not limited to being implemented by using an electrostatic capacitive touch sensor. That is, the input unit 112 of the touch panel 110 may be implemented by using: an electromagnetic induction touch sensor, a matrix switch touch sensor, a resistive touch sensor, a surface acoustic wave touch sensor, an infrared touch sensor, an optical sensor touch sensor or the like. In further explanation of each of the types of the touch sensors, an electromagnetic induction touch sensor requires the use of a special pen such as an electronic pen, a matrix switch touch sensor is composed of transparent electrodes having two-layer structures, a resistive touch sensor includes two resistive layers and voltage is applied to one resistive layer and the other resistive layer detects changes in voltage according to locations on the one resistive layer to which contact has been made, a surface acoustic wave touch sensor detects contact made by a finger or the like by detecting the reflection of ultrasonic waves by monitoring the voltage changes of piezoelectric elements, an infrared touch sensor detects a location thereof to which contact has been made by a finger or the like by using shielded infrared beams, and an optical sensor touch sensor detects a location thereof to which contact has been made by using an optical sensor provided to the screen.

Further, the above-described modifications applicable to the input unit 112 of the touch panel 110 are similarly applicable to each of the touch keys 121 through 126, which are explained as being implemented by using electrostatic capacitive touch sensors.

(7) In the embodiments, explanation is provided presuming that the touch keys 121 through 126 are located to the right side of the touch panel 110, as illustrated in FIG. 1. However, the present invention is not limited to this, and a part or an entirety of the touch keys 121 through 126 may be located above the touch panel 110, below the touch panel 110, or to the left side of the touch panel 110. In addition, in the embodiments, the LCD included in the display unit 111 of the touch panel 110 has a substantially rectangular shape. However, the present invention is not limited to this, and the LCD may exhibit, for instance, a circular shape or a shape of a polygon other than a rectangle.

(8) In the embodiments, explanation is provided by taking a touch key as one example of a touch-sensitive input device pertaining to the present invention. However, the present invention is not limited to this, and other touch-sensitive input devices, such as a touch panel, may be utilized.

When the touch-sensitive input device is a touch panel, there is a need of modifying the region table 10 into a table (referred to hereinafter as a "modified region table") having registered thereto information associating neighboring regions of the touch panel 110 and regions of the touch panel which is one example of the touch-sensitive input device that may be contacted along with the touch panel 110.

Further, similar to the mobile phone 100 pertaining to embodiment 1, the mobile phone pertaining to this modification performs control of disabling execution of processing based on input received by a region of the touch panel which is one example of the touch-sensitive input device that is associated with a contacted neighboring region of the touch panel 110 in the modified region table.

In addition, the modifications explained in modification 1 or embodiment 2 may also be applied to the mobile phone pertaining to this modification.

(9) In embodiment 1, explanation is provided that, when the processing in Step S1 in FIG. 5 is executed, the processing in Step S2 is executed unconditionally. Similarly, in modification 1, explanation is provided that, when the processing in Step S15 in FIG. 6 is executed, the processing in Steps S16 and S17 is executed unconditionally. However, the present invention is not limited to this, and modification may be performed such that the processing in Step S2 and the processing in Steps S16 and S17 are performed only when the mobile phone 100 is in a state (hereinafter referred to simply as a "lateral state" of the mobile phone 100) where the longitudinal direction of the housing 1 corresponds to a horizontal direction.

More specifically, the processing indicated in each of the flowcharts in FIGS. 5 and 6 is processing assuming cases where a user accidentally puts a finger or the like into contact with the touch keys while contacting the touch panel 110 with the finger or the like as illustrated in FIG. 2. Accordingly, it can be assumed that such cases are likely to occur when the mobile phone 100 is in the lateral state. Hence, modification may be performed in the above-described manner. When performing such a modification and when the mobile phone 100 is not in the lateral state, the processing in Step S4 of making a notification of a Press Panel event is executed immediately after the processing in Step S1 in FIG. 5 is executed, and the control processing is terminated immediately after the processing in Step S15 of FIG. 6 is executed. Accordingly, the processing load of the mobile phone 100 is reduced.

(10) In embodiments 1 and 2, explanation is provided of an example where the determination unit disables execution of processing based on a touch key having transmitted a detection signal by not notifying the event notification unit 144 of the key number of the touch key. However, the present invention is not limited to this, and other methods may be applied for disabling execution of processing allocated to a touch key. That is, the determination unit may be configured so as to perform control of stopping and resuming supply of power to the touch keys.

(11) The components explanation of which has been provided in the embodiments may be partially or entirely embodied as an integrated circuit having one chip or multiple chips. Further, the components may also be embodied as a computer program or as any type of embodiment.

Further, the components explanation of which has been provided in the embodiments operate in a cooperative manner with the processor included in each of the mobile phones, and thus, realize the functions provided thereto.

(12) A program for causing a CPU (Central Processing Unit) to execute the control processing (refer to FIGS. 5, 6, and 10) performed in response to input received by the touch panel 110 and the touch keys 121 through 126 as explanation has been made in the embodiments may be distributed by recording the program onto recording media, or by transmitting the program via various communication paths. Such recording media include IC cards, optical discs, flexible disks, ROMs, flash memories, and the like. The distributed program is to be stored to a memory or the like which may be read by the CPU provided to devices, so that the CPU may access and execute the program. Thereby, each of the functions of each of the mobile phones explanation of which has been provided in the embodiments is to be realized.

(13) The modifications described in (1) through (12) above may be partially or entirely applied in combination with the mobile phones pertaining to the embodiments.

(14) In the following, explanation is provided of a structure of a portable terminal pertaining to one embodiment of the present invention as well as of modifications thereof. Additionally, explanation is provided of advantageous effects yielded by such portable terminals.

(a) A portable terminal pertaining to one aspect of the present invention is a portable terminal including a touch-sensitive first input device and a touch-sensitive second input device that receive input when contact is made thereto, the portable terminal comprising: a first execution unit configured to execute processing that is in accordance with input received by the first input device; a second execution unit configured to execute processing that is in accordance with input received by the second input device; and a control unit that controls whether or not to inhibit the execution of the processing by the second execution unit according to which position on the first input device is contacted.

According to this structure, the portable terminal pertaining to one aspect of the present invention inhibits the execution of processing that is in accordance with input received by the touch-sensitive second input device according to which position on the first input device is contacted. Hence, the risk of processing that is unintended by a user being executed is reduced in cases where a user of the portable terminal accidentally contacts the second input device with a finger or the like while making user operations with respect to the first input device.

(b) The portable terminal pertaining to one aspect of the present invention may further comprise a position storage unit that stores a coordinate value indicating a predetermined position on the first input device, the predetermined position being a position on the first input device contactable along with the second input device, wherein the control unit may determine, when the first input device is contacted, whether or not a coordinate value indicating a contact position on the first input device matches the coordinate value stored in the position storage unit, and the control unit may disable the execution of the processing by the second execution unit for a predetermined time period when making an affirmative determination.

According to this structure, the portable terminal pertaining to one aspect of the present invention preemptively disables the execution of the processing that is in accordance with input received by the second input device for a predetermined time period when a user of the portable terminal contacts the predetermined position on the first input device. The predetermined position is a position on the first input device that is contactable along with the second input device. Hence, the risk of processing that is unintended by a user being executed is reduced in cases where the user accidentally contacts the second input device with a finger or the like within the predetermined time period.

(c) The portable terminal pertaining to one aspect of the present invention may further comprise a position storage unit that stores a coordinate value indicating a predetermined position on the first input device, the predetermined position being a position on the first input device contactable along with the second input device, wherein the control unit may determine, when the second input device is contacted, whether or not a coordinate value indicating a contact position on the first input device matches the coordinate value stored in the position storage unit, the contact position corresponding to contact made to the first input device within a predetermined time period up to when the second input device is contacted, the control unit may issue an instruction for executing the processing that is in accordance with input received by the second input device to the second execution unit only when making a negative determination, and the second execution unit may execute the processing that is in accordance with input received by the second input device when receiving the instruction from the control unit.

According to this structure, the portable terminal pertaining to one aspect of the present invention does not issue, to the second execution unit, the instruction for executing the processing that is in accordance with input received by the second input device even when input is received by the second input device if contact has been made to the predetermined position on the first input device within a predetermined time period up to when input is received by the second input device. The predetermined position is a position on the first input device that is contactable along with the second input device. Hence, the risk of processing that is unintended by a user being executed is reduced.

(d) In the portable terminal pertaining to one aspect of the present invention, the second input device may be provided in plurality, the control unit may determine, when the first input device is contacted, whether or not a direction in which a contact position on the first input device moves is within a predetermined directional range, and the control unit may disable the execution of the processing by the second execution unit for a predetermined time period when making an affirmative determination, the processing by the second execution unit being in accordance with input received by one of the second input devices that corresponds to the direction in which the contact position on the first input device moves.

According to this structure, the portable terminal pertaining to one aspect of the present invention preemptively disables the execution of the processing in accordance with input received by the second input device for a predetermined time period when a user of the portable terminal contacts the first input device and the contact position on the first input device moves in a direction within a predetermined directional range. Hence, the risk of processing that is unintended by a user being executed is reduced even if the user accidentally contacts the second input device with a finger or the like within the predetermined time period.

(e) In the portable terminal pertaining to one aspect of the present invention, the control unit may determine, when the second input device is contacted, whether or not a direction in which a contact position on the first input device has moved is within a predetermined directional range, the contact position corresponding to contact made to the first input device within a predetermined time period up to when the second input device is contacted, the control unit may issue an instruction for executing the processing that is in accordance with input received by the second input device to the second execution unit only when making a negative determination, and the second execution unit may execute the processing that is in accordance with input received by the second input device when receiving the instruction.

According to this structure, the portable terminal pertaining to one aspect of the present invention does not issue the instruction for executing the processing that is in accordance with input received by the second input device even when input is received by the second input device if the contact position on the first input device moves in a direction that is within the predetermined directional range. Hence, the risk of processing that is unintended by a user being executed is reduced.

(f) In the portable terminal pertaining to one aspect of the present invention, the first input device may comprise a touch panel.

According to this structure, the portable terminal pertaining to one aspect of the present invention inhibits the execution of processing that is in accordance with input received by the touch-sensitive second input device according to which position on the touch panel is contacted. Hence, the risk of processing that is unintended by a user being executed is reduced even when a user of the portable terminal accidentally contacts the second input device with a finger or the like while making user operations with respect to the touch panel.

(g) In the portable terminal pertaining to one aspect of the present invention, the second input device may comprise a touch key.

According to this structure, the portable terminal pertaining to one aspect of the present invention inhibits the execution of processing that is in accordance with input received by the touch key according to which position on the touch-sensitive first input device is contacted. Hence, the risk of processing that is unintended by a user being executed is reduced even when a user of the portable terminal accidentally contacts the touch key with a finger or the like while making user operations with respect to the first input device.

(15) The touch-sensitive first input device of the portable terminal pertaining to the present invention corresponds to the touch panel 110 of the mobile phone pertaining to the embodiments, and the touch-sensitive second input device of the portable terminal pertaining to the present invention corresponds to, for instance, the touch key 121 of the mobile phone pertaining to the embodiments. Further, the first execution unit and the second execution unit of the portable terminal pertaining to the present invention correspond to, for instance, the execution unit 150 of the mobile phones pertaining to the embodiments, and the control unit of the portable terminal pertaining to the present invention corresponds to, for instance, the control unit 140 of the mobile phones pertaining to the embodiments.

(16) The input control method pertaining to the present invention is realized, for instance, by the mobile phones indicated in the embodiments, modification 2, and modification 3 (particularly refer to the control processing procedures explained with reference to FIGS. 5, 6, 10, and 12).

INDUSTRIAL APPLICABILITY

The portable terminal pertaining to the present invention is applicable when a user performs user operations by using multiple touch-sensitive input devices.

REFERENCE SIGNS LIST

1 housing
100 mobile phone
110 touch panel
111 display unit
112 input unit
121-126 touch keys
130 coordinate storage unit
131 position storage unit
140 control unit
141 storing unit
142 determination unit
143 display control unit
144 event notification unit
150 function execution unit

The invention claimed is:

1. A portable terminal comprising:
a first input device configured to receive a first input thereon, and comprising a plurality of regions thereon;
a plurality of second input devices, wherein each of the plurality of second input devices is configured to receive a second input thereon, and wherein each of the plurality of second input devices corresponds to one of the plurality of regions of the first input device on a one-to-one basis; and
a processor configured to, upon receiving the first input,
determine a position of the first input on the first input device,
determine whether or not the position of the first input is within one of the plurality of regions of the first input device, and,
upon a determination that the position of the first input is within one of the plurality of regions of the first input device,
determine one of the plurality of second input devices that corresponds to one of the regions of the first input device within which the position of the first input is located of the first input device, and
inhibit execution of processing in accordance with any second input received by the determined one of the plurality of second input devices for at least a time period, while executing processing in accordance with any second input received by any others of the plurality of second input devices that correspond to one of the plurality of regions that does not include the position of the first input.

2. The portable terminal of claim 1, further comprising a position storage module configured to store one or more coordinate values corresponding to each of the plurality of regions of the first input device, wherein determining whether or not the position of the first input is within one of the plurality of regions of the first input device comprises determining whether or not a coordinate value of the position of the first input is included in one of the one or more coordinate values stored in the position storage module.

3. The portable terminal of claim 1, wherein the first input device comprises a touch panel.

4. The portable terminal of claim 1, wherein each of the plurality of second input devices comprises a touch key.

5. The portable terminal of claim 1, wherein the position of the first input comprises a position estimated based on a movement of the first input.

6. The portable terminal of claim 1, wherein the first input device further comprises a first region that is different than any of the plurality of regions, wherein determining whether or not the position of the first input is within one of the plurality of regions of the first input device comprises determining that the position of the first input is not within one of the plurality of regions of the first input device when the position of the first input is within the first region.

7. The portable terminal of claim 1, wherein the plurality of second input devices are arranged along one edge of the first input device, and wherein each of the plurality of regions of the first input device are positioned next to the one of the plurality of second input devices that corresponds to that region.

8. The portable terminal of claim 6, wherein the processor is configured to not inhibit execution of any of the plurality of second input devices, regardless of the position of an input received by the first input device, whenever the portable terminal is in a state in which the one edge of the first input device, along which the plurality of second input devices are arranged, corresponds to a substantially horizontal direction.

9. An input control method for a portable terminal, the input control method comprising:
receiving a first input on a first input device comprising a plurality of regions thereon;
receiving a second input on one of a plurality of second input devices that are each different than the first input device, wherein each of the plurality of second input devices is configured to receive an input thereon, and wherein each of the plurality of second input devices corresponds to one of the plurality of regions of the first input device on a one-to-one basis;

determining a position of the first input on the first input device in response to receiving the first input;

determining whether or not the position of the first input is within one of the plurality of regions of the first input device; and, upon a determination that the position of the first input is within one of the plurality of regions of the first input device, determining one of the plurality of second input devices that corresponds to one of the regions of the first input device within which the position of the first input is located of the first input device, and inhibiting execution of processing in accordance with any input received by the determined one of the plurality of second input devices, for at least a time period, while executing processing in accordance with any input received by any others of the plurality of second input devices that correspond to one of the plurality of regions that does not include the position of the first input.

* * * * *